No. 631,647. Patented Aug. 22, 1899.
S. D. LOCKE.
HARVESTER BINDER.
(Application filed Mar. 17, 1886.)
(No Model.)
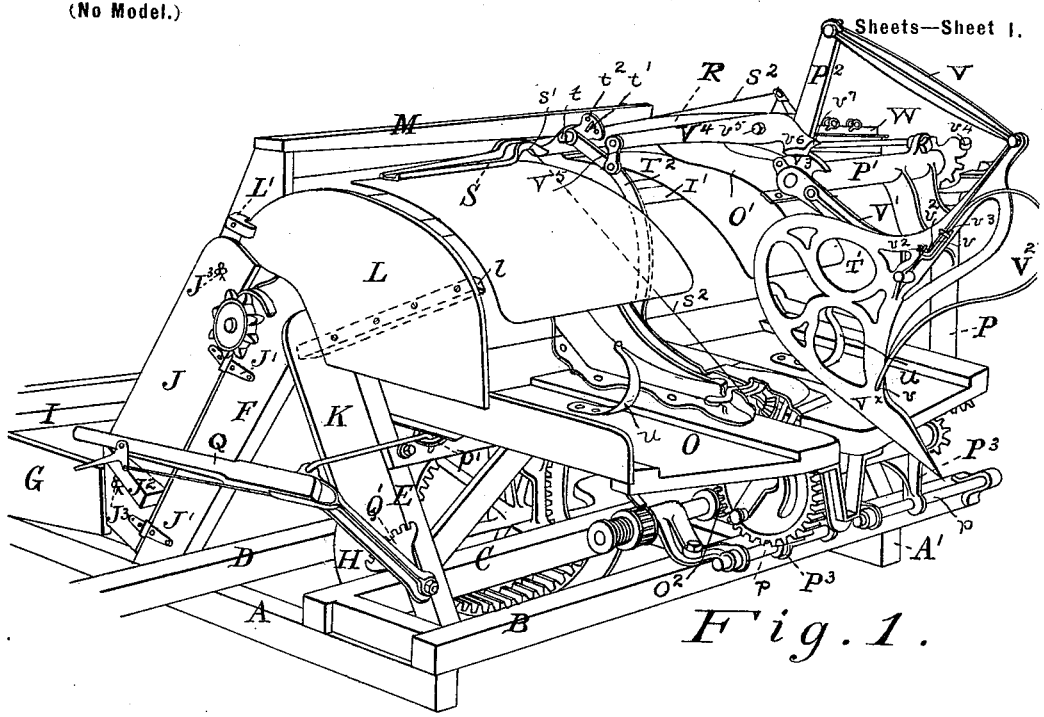
*Fig. 1.*
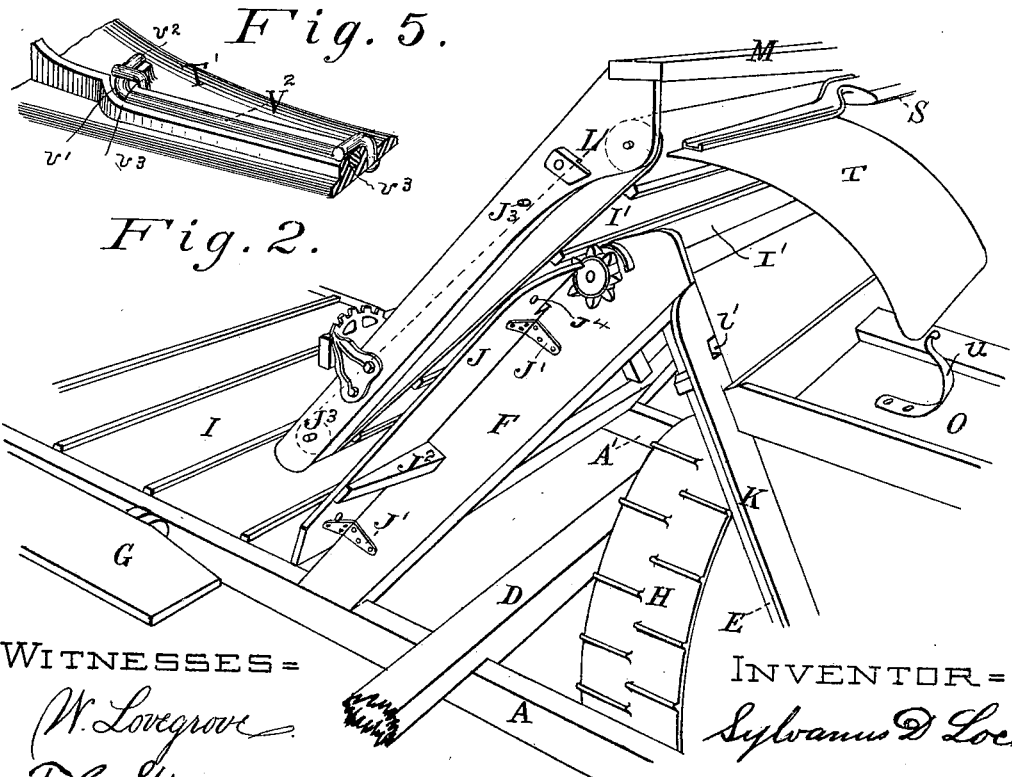
*Fig. 5.*
*Fig. 2.*
WITNESSES:
W. Lovegrove
F. C. Skinner
INVENTOR:
Sylvanus D. Locke No. 631,647. Patented Aug. 22, 1899.
S. D. LOCKE.
HARVESTER BINDER.
(Application filed Mar. 17, 1886.)
(No Model.) 3 Sheets—Sheet 2.

WITNESSES
W. Lovegrove
F. C. Skinner

INVENTOR
Sylvanus D. Locke

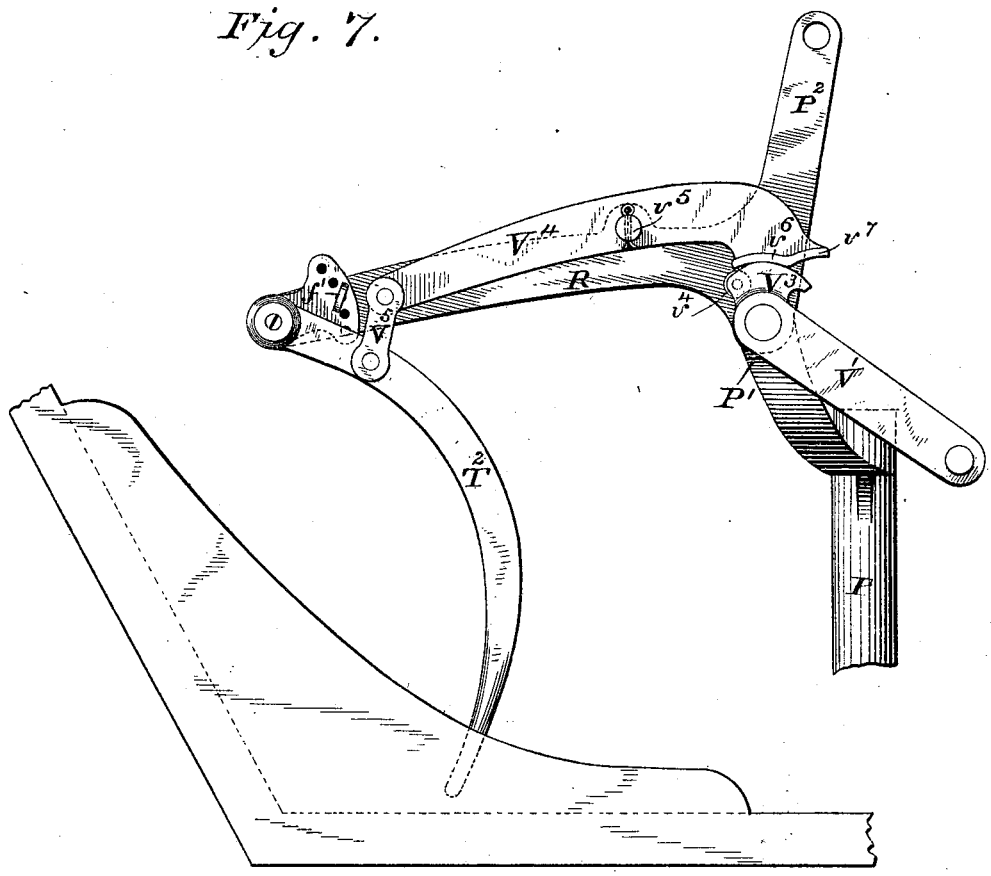

UNITED STATES PATENT OFFICE.

SYLVANUS D. LOCKE, OF HOOSIC FALLS, NEW YORK.

HARVESTER-BINDER.

SPECIFICATION forming part of Letters Patent No. 631,647, dated August 22, 1899.

Application filed March 17, 1886. Serial No. 195,576. (No model.)

*To all whom it may concern:*

Be it known that I, SYLVANUS D. LOCKE, a citizen of the United States, residing at Hoosic Falls, in the county of Rensselaer and State of New York, have invented certain new and useful Improvements in Harvester-Binders, of which the following is a specification.

The harvester which I propose to use has its upper elevator-apron mounted in a frame overhung from the front of the machine, so as to leave an open throatway at the rear through which the heads of the long grain may project as they are carried up; and my invention consists, among other things, in providing a swinging board or door for this throat, hinged to the underlying strut, so that when turned up and secured to the overhung apron-frame the throat will be closed and the rear of said frame and the latter be supported from the strut, thereby preventing vibrations of the overhung frame and disarrangement of its canvas and rolls, and when turned down or opened it will afford a table for and support the tops of long grain projecting through the throat; also, in combining with such open throatway and with the binding-receptacle a detachable headboard or fence at the rear of said receptacle and supported rigidly from the harvester, so as to overhang the receptacle and permit its free adjustment back and forth, all as will presently appear.

Figure 3:
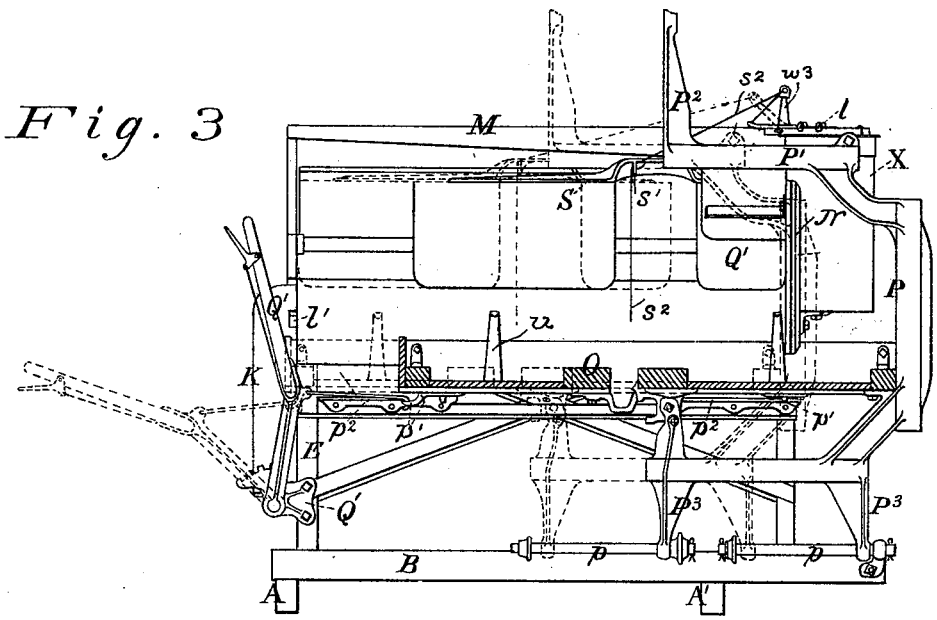
Figure 4:
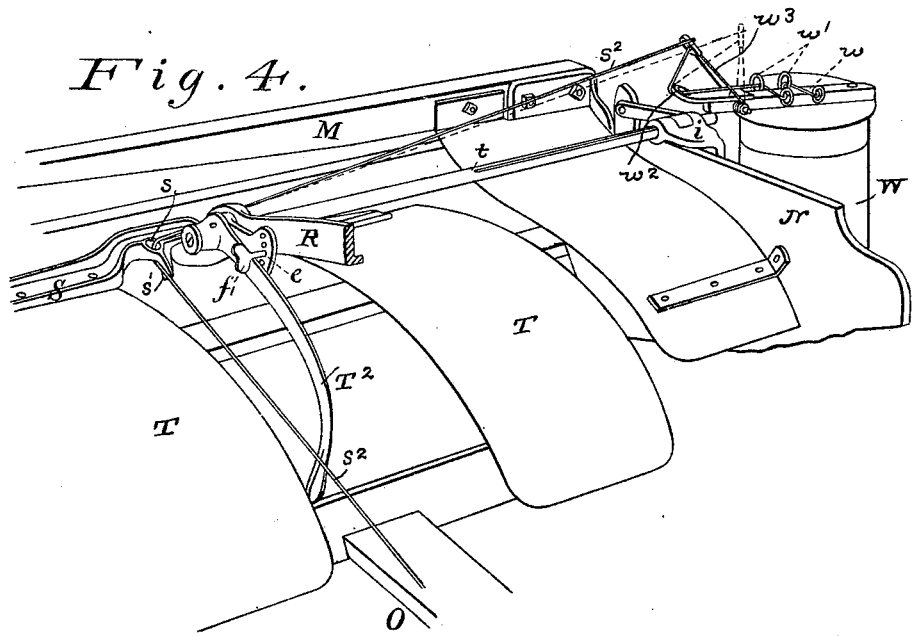
Figure 6:
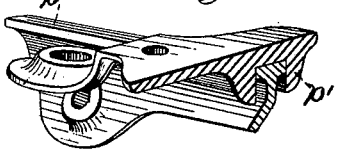

In the drawings, Figure 1 is a view in perspective, from a point at the right and to the rear, of enough of an automatic binding-harvester to illustrate my invention as applied thereto. Fig. 2 is a similar view and from a similar position, showing the rear or extension boards turned down as to the harvester and that of the binder removed. Fig. 3 is an end elevation of a portion of the same, explaining the manner in which the binding-receptacle, with its hood, is adjusted along the end of the delivery mechanism. Fig. 4 is a perspective view showing the cord-box and tension device and illustrating the way the cord is run. Fig. 5 is an enlarged detail showing the manner of securing the compressing-spring to the band-carrying arm, and Fig. 6 is an enlarged detail explaining the manner of securing the binder on the upper rails of the harvester. Fig. 7 is an enlarged detail, in rear elevation, of the mechanism controlling the cut-off or separator.

A is the rear sill of the harvester-frame, and A' the front sill, which is usually a prolongation of the finger-beam.

B is the girth at the stubble end, and C a parallel girth inside thereof adjacent to the main wheel and constituting the outer lateral bar of the wheel-frame and, with the stubble-girth, also serving as a gear-frame. D is another girth parallel with the foregoing two but inside the main wheel and furnishing the second or inner lateral bar of the wheel-frame.

E represents the rear outer strut of the elevator-frame, and F the opposing or inner strut.

G is an extension-board hinged to the platform, or, rather, to the rear sill, and serving when turned down to give additional depth to said platform in order to support the heads or tops of long grain and when turned up as a wind board or guard, H the main wheel, I the platform-carrier or lower canvas, and I' the stripper-roll at the head of the lower elevator-apron, all of which do not or need not materially differ from corresponding parts in machines already well known.

As heretofore constructed, the elevator is either closed entirely at each side—fenced, as it were—or has an open throatway at the rear through which the heads or tops of long grain may project. The open throatway enables the manufacturer to very much narrow, and therefore to lighten and cheapen, the harvester and still carry longer grain than a much wider machine with a closed elevator can carry; but it is sometimes necessary or desirable, as in light puffy grain that is inclined to run back on the machine, to have the elevator closed. To secure the advantages of a closed elevator in a harvester having such an open throatway in the rear, I attach to the inner rear elevator-strut a wing-board J, which is connected therewith by hinges J' and is prevented from falling below a horizontal position by a stop J², that forms, in effect, a rule-joint with the hinges. When turned up, this wing-board shuts against the rear bar of the overhung frame for the upper elevator-apron and is secured thereto by any suitable locking device—as, for instance, by the pins and keys J³, the former passing through holes J⁴ in said board—thus supporting the rear end of said overhung frame and making it practically rigid with the harvester-frame at that point. When it is desired to prevent short or tangled or puffy grain from sliding back on the apron or escaping from the harvester, the hinged rear boards of the platform and elevator are both turned up, as shown in Fig. 1, to act as a rear fence or guard. If long grain is being harvested, these rear boards are turned down, as shown in Fig. 2, to clear the open throatway and permit an uninterrupted flow of grain at the rear. In this position they support and bear up the heads or tops of the grain projecting through the throatway. This rear wing-board J is also hinged and made to turn up to form a rigid support for the overhung or float part of the elevator-frame for another and distinct purpose implied, but not fully set forth, in the foregoing.

In the use of a harvester-binder having an elevator with a rear open throatway and with its overhung frame entirely supported from the front of the machine a very serious difficulty is met that often proves fatal to the successful operation of the machine. This difficulty is caused by vibrations set up in the necessarily light overhung elevator-frame when that frame is not supported by the grain passing up the elevator toward the binder. When the grain is so heavy and long as to require a throatway open at the rear, the canvas or belt-rake carried by the overhung frame rests on and presses down the grain, so preventing vibrations of the frame; but when the grain is thin and short it does not support the frame and vibrations, sometimes excessive and racking, as when operating in a stony field, are set up. These vibrations are sure to appear when hauling the machine along a common stony road to and from the field or from one field to another. The vibration of this light overhung frame racks and twists it so out of form and shape that the rolls are cramped in their bearings and the canvas or belt-rake is so guided sidewise as to prevent it running, thereby choking down the elevator and stopping the machine. The cramping of the apron-rolls has been obviated by some builders by joining the gudgeons to the rolls by universal joints. I avoid this difficulty by the employment of the hinged wing-board J, that when down secures an open throatway for the passage of the long grain and a support for its heads, and when closed up and locked against the overhung frame, as when the open throatway is not necessary, it binds and rigidly joins this float part of the frame to the main and lower frame of the elevator, thereby preventing all vibrations of the overhung frame and avoiding the above-named serious and sometimes fatal difficulty.

The rear elevator-struts have usually heretofore marked the extreme limit to which the heads of grain have been supported in their passage from the delivery end of the platform-carrier to the binding-receptacle. The hinged boards just referred to in the present case project the first of them beyond the rear sill and the second beyond the inner elevator-strut, and thus support the heads of the grain from the divider end of the platform to the head of the elevator, and that these heads may continue to be supported in their passage down the grain-chute I secure to the rear outside strut a wing-board K, that extends the grain-chute rearwardly beyond this strut and at the same time owing to its location covers and conceals the drive-chain running up, as usual, alongside said strut. This I do not hinge or affix rigidly to its support, first, because it is intended to extend to or near to the foot of such supporting-strut to act as a shield for the driving-chain, and, second, because if hinged it would interfere with the movement of the binding-table, which must in its adjustments be free at all times to slide past it and reach its outer edge.

Lest the grain as it is being massed in the receptacle or upon the binding-table may slip back or slide wholly out of the receptacle and drop upon the ground at the rear of the machine a rear board L is provided in the nature of a wind-board attached to the elevator-frame of the harvester and overhanging the receptacle, so as to fence it in at the back of the machine. This rear board is not necessary and cannot be used in long grain. It is therefore made detachable at will, as shown in the drawings, being for the purposes of this description held in position by inserting the projecting foot of its cleat $l$ into the socket or mortise $l'$, formed in the rigid wing-board, and by the button or clip $L'$, secured to the rear bar of the overhung part of the elevator-frame. When thus set up in position and secured by the button, it will press against the upper end of the overhung frame and in connection with the overhung supporting-bar M will hold it against sagging. It is used in connection with the hinged rear board of the ascending side of the elevator and the hinged rear board of the platform when all three are in a vertical position to close up the entire binder and harvester at the rear, and thus carry the grain through a closed passage from divider end to discharge end and insure that it shall not run so far back on the machine when tangled or disordered so as to bind poorly or not at all. On the other hand, when the rear board is detached and the hinged boards turned down into a horizontal position an open throatway is afforded in the rear throughout the entire length of the machine for long grain to pass without hindrance or doubling the straw.

Upon the harvester is secured the binding attachment overhung at the front by the usual stationary wind-board N and consisting in part of a table or receptacle $o$, stationary shield $O'$, fixed to the elevator-frame, driving mechanism $O^2$, and cast main frame or bracket P, in the overhung tubular arm or sleeve $P'$ of which is mounted the binder-arm shaft, and having at the rear end of this overhung sleeve an upright or standard P² for the support of the heel of the binder-arm, all in general as heretofore known.

The binder-frame has its feet P³ supported and sliding on rails $p$, attached to the stubble-girth of the harvester-frame, and the table or receptacle, with its forks $p'$, is supported and slides on rails $p^2$, attached to the elevator-frame, thereby enabling the whole binding mechanism to be adjusted back and forth along the delivery end of the harvester by means of the lever Q, pivoted upon a bracket Q' and locking into the interdental spaces of a segment-rack upon said bracket.

Secured to the rear end of the overhung sleeve of the main bracket is a bar R, extending inwardly therefrom to near the head of the elevator and carrying at its extreme inner end a bracket-casting S, one arm of which extends directly to the rear and the other arm directly to the front and which has centrally or at the point near which the nose of the binder-arm plays an eye $s$ and finger $s'$ for the passage and guidance of the binding-cord $s^2$, whereby it is held in position to be caught by the binder-arm as the latter descends. To this bracket I secure the curved hood or deflector-plates T, between which are the band-carrying arm T', and the trip-lever T², loosely pivoted on the end of the trip-shaft $t$ and engaging with a pin $t'$, adjustable in a series of perforations $t^2$ in a segment-arm rigidly affixed to said trip-shaft during the operation of binding. This hood being rigidly connected with the main bracket or binder-frame is carried back and forth therewith and with the binding-arm and trip-lever in all adjustments to the length of the straw, enabling the width of the slot between its two sections to be reduced to the minimum, and as its upper end is brought by the cross-bar or supporting-bracket, to which it is secured, close to the head of the elevator it forms practically a continuous closed passage at all times from said head to the binding-receptacle to hold the grain down in the latter and prevents its entanglement with the binder-arm. At the foot of each section of this adjustable hood I secure to the binding-table curved springs U, the upper ends of which come into close proximity with the lower edge of the hood-sections, the stationary member of which in the back-and-forth adjustments plays therealong, but never passes beyond the springs. Thus a practically-closed receptacle is formed for the grain until it has been encircled and pressed by the binder-arm and is carried outward in the ejecting movement, when the table-springs will yield for its passage and immediately rise behind it to again close the exit from the receptacle.

The binding-arm V×, which I have illustrated in this application, substantially resembles one described by me in an application heretofore filed in the Patent Office—that is to say, it is supported from the upright arm or standard at the rear of the overhung sleeve of the main bracket by means of a link V, pivoted first to said standard and then to the heel of the binder-arm, is operated by means of a crank V', secured to the binder-arm shaft supported in said sleeve, the wrist-pin of this crank taking into the binder-arm about centrally of its length, and is provided with a spring V², hooked into it, as at $v$, near its nose, and thence carried back, recurved, and at its farther end secured to the shank of the arm—but I have changed the method of fastening it at this farther end and now form in the arm in the act of casting a recessed seat $v'$, into which the bent end $v^2$ of the spring is inserted, as shown in Figs. 1 and 5, and in which it is firmly and cheaply secured by clips or hook-bolts $v^3$, passing through the arm and held by nuts or by riveting.

It is desirable that there should be a cut-off or separator to act upon and hold back the incoming stream of grain at the point where the binder-arm shears off the gavel. This has heretofore usually been the office of an independent arm either moving up through the binding-table or grain-chute or else moving down through the head or deflector. In my improvement the office is imposed upon the trip-arm, and to this end the binder-arm shaft or else the hub of the crank at the rear end of said shaft is provided with a cam V³, which at its forward or advancing end preferably has a pivot-pin $v^4$, upon which an antifriction-roller is to be placed. A lever V⁴, fulcrumed upon a stud-bolt $v^5$, secured to a support from the overhung arm of the main bracket, herein conveniently the above-mentioned insetting bar which carries the bracket-head for the adjustable hood, is connected at its power end by means of a link V⁵ to the trip arm or finger and at its heel end has a shoe $v^6$ to engage with the cam and beyond this shoe an inclined face $v^7$, which meets the advancing end of said cam. The cam has the main portion of its face, except a slight outward spiral or incline behind the antifriction-roller, concentric with the axis of the binder-arm shaft, and when in motion, the binding mechanism having already been started by the trip-finger, this advancing end striking the incline at the heel end of the lever just as the binder-arm descends to pierce the grain forces said trip-finger down under cover of the binder-arm or alongside of it. As the binder-arm passes through and opens up a wide path by means of its concentric guard, the trip-finger in its function as separator passes down in this path and sweeps and holds back the incoming stream of grain while the binder-arm carries the gavel forward away from it. The cam is continued around the shaft concentrically so far as to hold the separator down and the grain back until the bundle is completely separated from entanglement with the stream. To secure this object, it is necessary to hold it down until the bundle is ejected. I hold it somewhat longer; but as the space for the grain accumulating back of the separator is not large it may be released and allowed to resume its original function of a trip-finger as soon as the binder-arm starts on its return journey. This function it retains until the binder-arm again descends for another bundle, when it is once more a separator to aid the arm in making a complete division of the bundle from the incoming stream, as before.

The machine is supplied with binding-cord from balls carried in a case W, mounted at the foot of the machine. The cord coming out of this case through the exit-orifice $w$ is carried through a suitable tension device—for instance, the guides $w'$, arranged alternately on each side of a given line, so that the cord may zigzag through them—and thence goes to the binder in any way, as through the guide $w^2$ and take-up $w^3$, as shown, then through the guide-eye $s$ in the deflector-bracket and past the finger $s'$ down to the holder, where its end is secured. The binding-arm, it will be understood, has no eye for the reception of the cord, but, like the one in my above-mentioned application, has a lateral flange which catches the cord-strands stretched between the finger $s'$ and holder near to said finger in each movement to divide off the gavel.

I claim—

1. The combination substantially as hereinbefore set forth, in a harvester-elevator, with a frame overhung from the front of the machine and carrying the upper elevator apron or float, of an extension-board hinged to the rear inner elevator-strut and adapted to close up against the rear of and support said overhung frame.

2. The combination substantially as hereinbefore set forth, in a harvester-elevator, with a frame overhung from the front of the machine and carrying the upper elevator apron or float, of an extension-board hinged to the rear inner elevator-strut and closing up against said overhung frame, and locking devices securing said board to said frame when closed, whereby it serves to support the frame at the rear.

3. The combination substantially as hereinbefore set forth, with a platform extension-board hinged to the rear sill of the harvester, of a frame for the upper elevator-apron, overhung from the front of the machine, and an extension-board hinged to the rear elevator-strut and adapted to close up against and supporting said overhung frame.

4. The combination substantially as hereinbefore set forth, with the elevator-frame and with the adjustable binding attachment, of a detachable headboard overhung from said elevator-frame at the rear of the binding attachment.

5. The combination substantially as hereinbefore set forth, with the elevator-frame and adjustable binding attachment, and with a frame supporting the upper elevator-apron overhung from the front of the machine, of a detachable headboard overhanging the binding-table from said elevator-frame and serving to support and brace the head of the upper-apron frame.

6. The combination substantially as hereinbefore set forth, of an extension-board hinged to the rear platform-sill, an elevator having an open throatway at its rear, an extension-board hinged to the rear elevator-sill so as to be closed up against the overhung part, and a detachable headboard closing the rear of the binding-table.

7. The combination substantially as hereinbefore set forth, with the harvester-elevator and with the overhung frame for the upper elevator-apron, and with the adjustable binding-table, of the headboard L, its cleat, $l$, taking into a socket, $l'$, at the outer side of said elevator-frame, and the button L' on the overhung frame, whereby said board may be detached, and when in position serves to brace and support the overhung frame.

8. The combination substantially as hereinbefore set forth, with the elevator-strut F, of the hinged extension-board J, the overhung frame supporting the upper elevator-apron, and the pins and keys $J^3$, whereby the hinged extension-board may be closed up and fastened to support the rear end of the overhung frame.

9. The combination substantially as hereinbefore set forth, with a vibrating trip-lever overhanging the grain-passage, and with the trip-shaft, of mechanism whereby said trip-lever is forced through the stream of grain after having yielded to start the binding mechanism, that it may act as a cut-off during the binding operation.

10. The combination substantially as hereinbefore set forth, with the vibrating trip-lever and binding-arm, of mechanism whereby said trip-lever after yielding to start the binding mechanism is carried through the grain alongside the binding-arm to separate and cut off the incoming grain from the gavel.

11. The combination substantially as hereinbefore set forth, with the vibrating trip-lever, of mechanism acting to carry it down through the stream of grain immediately after the binder is started, and locking devices to hold it down until the sheaf is bound and ejected.

12. The combination substantially as hereinbefore set forth, with the vibrating trip-lever overhanging the grain-chute, of the orbitally-moving binder-arm, the cam on the binder-arm shaft, and an intermediate lever acting on said trip-lever and actuated by the cam, whereby the trip-lever after starting the binder is forced down alongside the binder-arm and then locked, to act as a separator and cut-off.

13. The clips $v^3$ securing the spring $V^2$ and the arm $V^\times$, substantially as described.

SYLVANUS D. LOCKE.

Witnesses:
E. J. LOCKE,
N. W. LOCKE.